(12) United States Patent
Liu

(10) Patent No.: US 7,421,265 B1
(45) Date of Patent: Sep. 2, 2008

(54) SELECTABLE NETWORK ANTENNA SYSTEMS AND METHODS

(75) Inventor: Calvin Y. Liu, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 11/072,034

(22) Filed: Mar. 4, 2005

(51) Int. Cl.
*H04B 1/08* (2006.01)
*G06K 7/10* (2006.01)

(52) U.S. Cl. .................. 455/347; 455/90.3; 455/575.7; 455/128; 455/129; 235/472.01

(58) Field of Classification Search .............. 455/347, 455/346, 348, 88, 550.1, 552.1, 553.1, 556.1, 455/557, 558, 562.1, 566, 575.1, 575.7, 575.3, 455/90.3, 128–129; 235/472.01, 462.13, 235/462.45, 449
See application file for complete search history.

(56) References Cited

U.S. PATENT DOCUMENTS

| | | | | |
|---|---|---|---|---|
| 5,453,019 A | * | 9/1995 | Garver et al. | 439/188 |
| 6,497,368 B1 | * | 12/2002 | Friend et al. | 235/472.01 |
| 6,631,276 B1 | * | 10/2003 | Yamaguchi et al. | 455/561 |
| 6,859,186 B2 | | 2/2005 | Lizalek et al. | |
| 2006/0181462 A1 | * | 8/2006 | Kelly et al. | 343/702 |

* cited by examiner

*Primary Examiner*—Pablo N Tran
(74) *Attorney, Agent, or Firm*—MacPherson Kwok Chen & Heid LLP; Greg J. Michelson

(57) ABSTRACT

A network device is disclosed, in accordance with an embodiment of the present invention, which includes a transceiver adapted to transmit and receive information and an internal antenna and an external antenna connector coupled to the transceiver. A housing encloses the transceiver, the internal antenna, and the external antenna connector, with the housing having a door operable to provide access to the external antenna connector for coupling an external antenna.

18 Claims, 5 Drawing Sheets

SELECTABLE NETWORK ANTENNA SYSTEMS AND METHODS

TECHNICAL FIELD

The present invention relates generally to electrical devices and, more particularly, to selectable antenna techniques, such as for routers and other network devices.

BACKGROUND

Network devices are growing in popularity as the relative cost decreases and the relative ease of setup and convenience increases for computer-networked systems. Additionally, wireless network devices have added greatly to the relative ease of setup for a network, because the often-difficult task of routing network cables through walls and other structures to a desired location may be eliminated.

One type of network device, for example, is a router, which may be configured to provide wireless networking capability. A typical router may include an internal or external antenna to provide wireless network coverage. However, if configured with the internal antenna, the wireless range of the router may be more limited than desired. If configured with a fixed external antenna, the router may lack the flexibility to allow replacement of the fixed external antenna with another type of antenna (e.g., a higher gain antenna or a directional antenna) that may be desired by the user. As a result, there is a need for improved techniques for wireless network devices.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
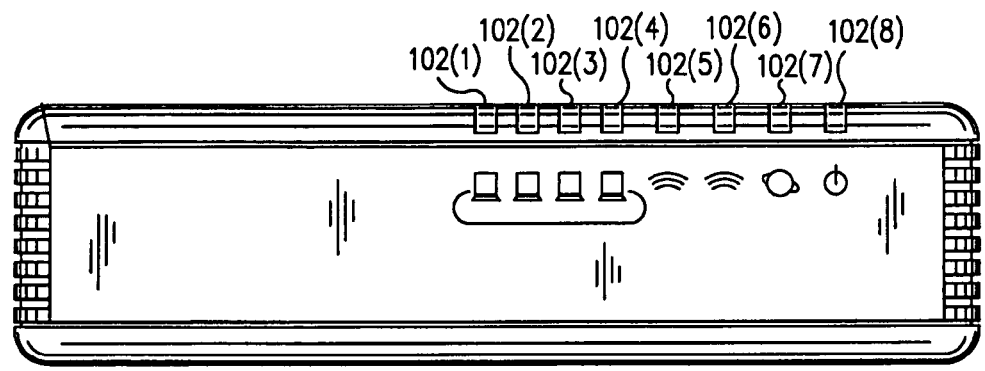
FIG. 1 shows a diagram illustrating a front side of a router in accordance with an embodiment of the present invention.

FIG. 1 shows a diagram illustrating a front side of a router 100 in accordance with an embodiment of the present invention. As described herein, router 100 is an exemplary network device that includes selectable antennas (e.g., internal and external) and various other optional features in accordance with one or more embodiments of the present invention.

As shown in FIG. 1, router 100 may include one or more indicator lights 102 (e.g., light emitting diodes) to provide a user of router 100 with various information (e.g., on/off status, connection and transmission status, hardware error or various types of malfunctions). For example, in accordance with an embodiment of the present invention, router 100 may include indicator lights 102(1) through 102(8). Indicator lights 102(1) through 102(4) provide port connectivity status for four corresponding connections (e.g., wired Ethernet port connectivity to four corresponding computers).

Indicator lights 102(5) and 102(6) provide wireless support status for router 100 for two corresponding wireless standards (e.g., IEEE 802.11a and IEEE 802.11g or IEEE 802.11b and IEEE 802.11g) provided by router 100. Indicator light 102(7) provides a network status indication (e.g., Internet connection status), while indicator light 102(8) indicates whether router 100 is receiving power.

Figure 2:
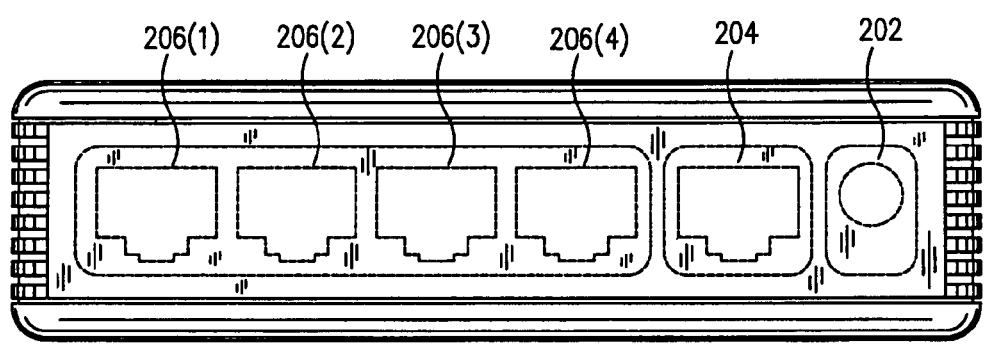
FIG. 2 shows a diagram illustrating a back side of a router in accordance with an embodiment of the present invention.

FIG. 2 shows a diagram illustrating a back side of router 100 in accordance with an embodiment of the present invention. Router 100 includes a power connection port 202, a network connection port 204 (e.g., for an Internet connection), and one or more Ethernet ports 206 (e.g., Ethernet ports 206(1) through 206(4)). As an example, when power is provided via power connection port 202, indicator light 102(8) switches on to indicate that router 100 is receiving power. Similarly, when a connection is made through network connection port 204 and Ethernet ports 206(1) through 206(4), corresponding indicator lights 102(7) and 102(1) through 102(4) switch on to indicate the status of the connections.

Figure 3:
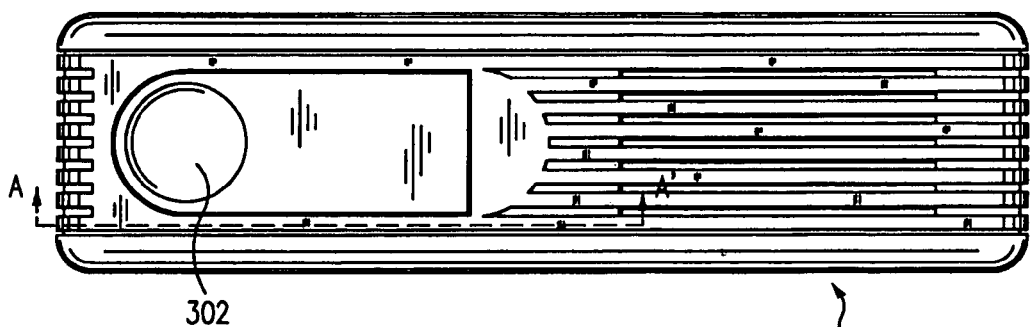
FIG. 3 shows a diagram illustrating a first side of a router with an external antenna port door in accordance with an embodiment of the present invention.

FIG. 3 shows a diagram illustrating a first side of router 100 in accordance with an embodiment of the present invention. Router 100 includes a pivoting element 302, which a user may operate if an external antenna connection point (e.g., external antenna terminal) is desired. For example, pivoting element 302 may represent a hinged door that, when rotated open, provides the external antenna connection point. Alternatively, pivoting element 302 may be substituted with a sliding element that a user slides open to expose the external antenna connection point.

Pivoting element 302 may be secured, for example, with a latch that releases when a user briefly pushes in on pivoting element 302. When the latch releases, the user can then grasp and rotate outward pivoting element 302 to an open position. When pivoting element 302 is rotated back to a closed position, the latch once again secures pivoting element 302 in a closed position.

Figure 4:
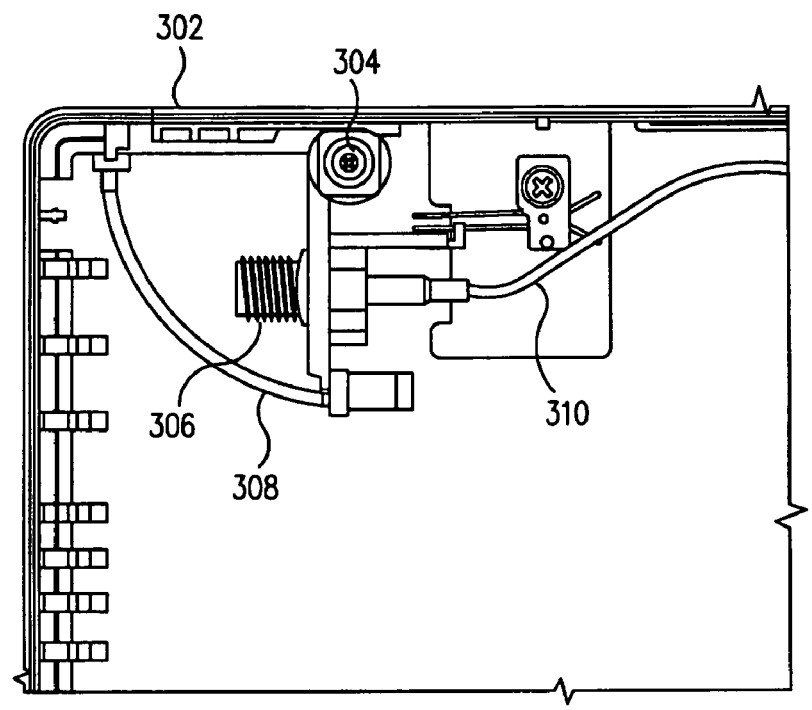
FIG. 4 shows a cross-sectional view of a portion of the router illustrating the external antenna port door in a closed position in accordance with an embodiment of the present invention.
Figure 5:
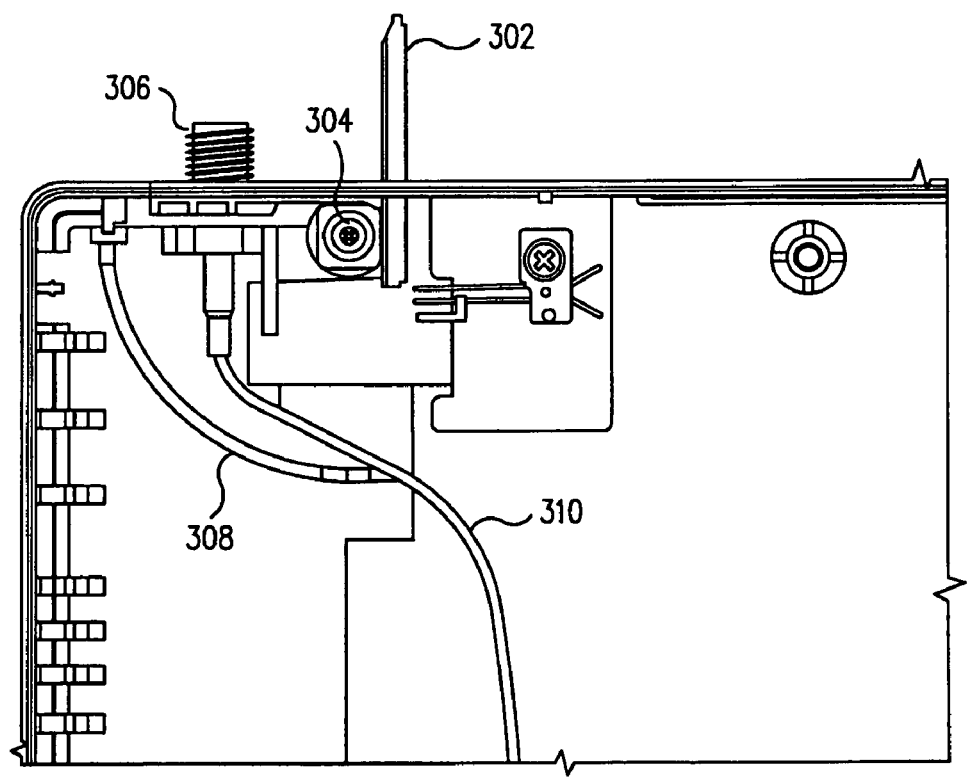
FIG. 5 shows a cross-sectional view of a portion of the router illustrating the external antenna port door in an open position in accordance with an embodiment of the present invention.

As an example, FIGS. 4 and 5 show cross-sectional views (along a line A-A' of FIG. 3) of a portion of router 100, which illustrate pivoting element 302 in a closed and an open position, respectively, in accordance with an embodiment of the present invention. As illustrated, pivoting element 302 may have a hinge 304, which allows pivoting element 302 to rotate outward. Hinge 304 may hold pivoting element 302 in an open position when rotated completely outward, as shown in FIG. 5.

A portion of pivoting element 302 includes an external antenna connector 306, which is rotated along with pivoting element 302 so that external antenna connector 306 extends outward from router 100 and is easily accessible by the user.

External antenna connector 306 may represent an SMA connector, a TNC connector, or any other type of antenna connector desired for connecting an external antenna (not shown) to router 100. A guide 308 may be provided to constrain and maintain proper positioning of an antenna signal path 310 between external antenna connector 306 and the electrical circuitry (not shown) within router 100.

Pivoting element 302 may be viewed, for example, as an external antenna port door that a user may open when it is desired to attach an external antenna. For example, if the internal antenna (not shown) within router 100 does not provide sufficient coverage, a user may connect an external antenna (e.g., a high gain antenna or a directional antenna) to external antenna connector 306 (after opening pivoting element 302) to provide the desired wireless performance.

Figure 6:
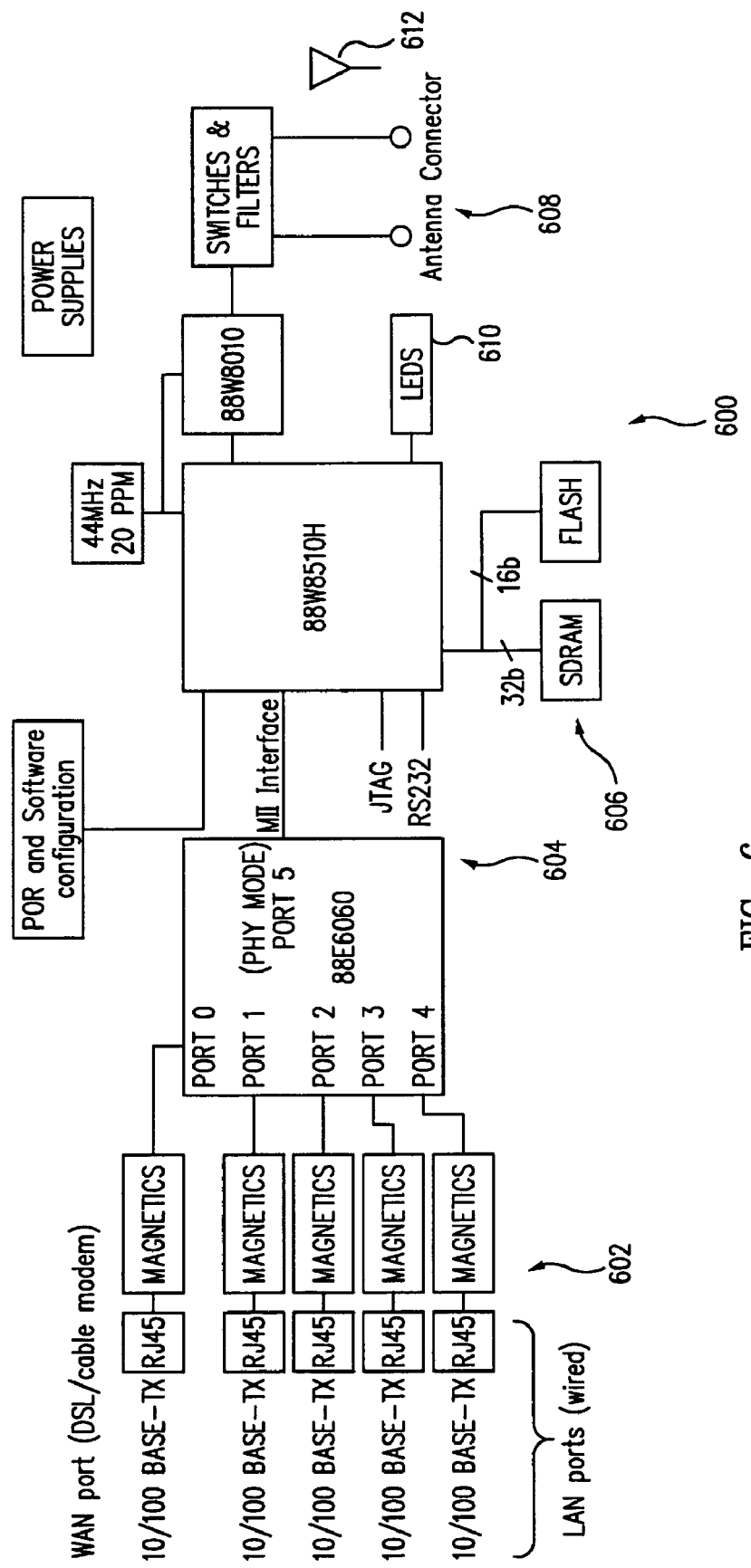
FIG. 6 shows a functional block diagram of a router in accordance with an embodiment of the present invention.

FIG. 6 shows a functional block diagram 600, which represents an exemplary functional implementation of router 100 in accordance with an embodiment of the present invention. Diagram 600 includes ports 602, router function blocks 604, memory 606 (e.g., SDRAM and FLASH memory), antenna block 608, light emitting diodes (LEDs) 610 (e.g., to provide indicator lights 102), and one or more antennas 612.

Ports 602 include at least a wide area network (WAN) port (e.g., for providing the Internet connection) and one or more local area network (LAN) ports. For this exemplary implementation, the WAN and LAN ports may be associated with indicator lights 102(7) and 102(1) through 102(4), respectively, of FIG. 1, with these indicator lights providing network status for these WAN and LAN ports. In FIG. 6, LEDs 610 represent indicator lights 102 of FIG. 1.

Router function blocks 604 provide, for example, processor functions, switch functionality, radio frequency transceiver functionality, and wired and wireless router functionality. As an example, these functions may be provided as shown by a chipset (e.g., 88E6060, 88W8510H, and 88W8010 chipset) provided by Marvell® Semiconductor, Inc. of Sunnyvale, Calif. As a specific example, router 100 may be configured to provide a wireless access point to wirelessly connect various devices to a network, provide a four-port full duplex switch to connect wired Ethernet devices and/or form a daisy chain with other hubs or switches, and provide router functions and allow the sharing of an Internet connection (e.g., cable or DSL Internet connection).

Antenna block 608 provides switches and filters for providing signals from one or more antennas 612. For example, antenna 612 may represent an internal antenna (e.g., a planar inverted "F" antenna (PIFA)), which may be coupled to antenna block 608 or incorporated into antenna block 608 or some other functional block of diagram 600. Antenna 612 may also represent an external antenna that is couplable to antenna block 608 via external antenna connector 306, with external antenna connector 306 forming part of antenna block 608.

In accordance with an embodiment of the present invention, antenna block 608 may include a switch, with the switch position determined by the position of pivoting element 302. When pivoting element 302 is in the closed position (i.e., no external antenna connected to router 100), then the switch is set so that router 100 utilizes the internal antenna to receive or transmit signals. When pivoting element 302 is in the open position (i.e., an external antenna is connected to router 100), then the switch is set so that router 100 utilizes the external antenna to receive or transmit signals (e.g., via antenna signal path 310).

Alternatively, in accordance with an embodiment of the present invention, rather than a switch position determined by pivoting element 302, router 100 may simply transmit and receive through the internal antenna and through the antenna signal path for the external antenna. If an external antenna is coupled to the antenna signal path, the signal strength generally will be much greater through the external antenna and utilized for the wireless communications.

As another example, in accordance with an embodiment of the present invention, router 100 may determine when the external antenna is connected based on the proper termination of external antenna connector 306 by the external antenna. Therefore, if the proper termination exists, which signifies that the external antenna is connected, then router 100 utilizes the external antenna to transmit and receive. If the proper termination does not exist, which signifies that the external antenna is not connected, then router 100 utilizes the internal antenna to transmit and receive.

Figure 7:
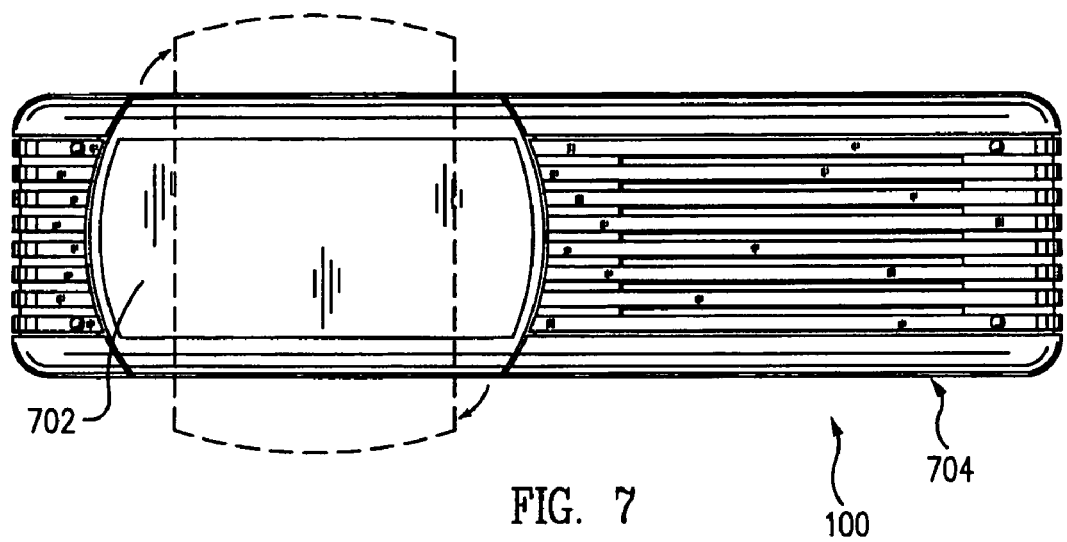
FIG. 7 shows a diagram illustrating a second side of a router with a selectable stand in accordance with an embodiment of the present invention.

FIG. 7 shows a diagram illustrating a second side of router 100 in accordance with an embodiment of the present invention. Router 100 may include a selectable stand 702 that may be utilized to allow router 100 to be positioned in a vertical rather than a horizontal position. For example, FIG. 7 shows stand 702 in a closed position, which allows router 100 to be positioned to rest on its bottom surface (i.e., a surface 704) and also shows stand 702 (in dashed lines) in an open position after stand 702 has been rotated (e.g., approximately ninety degrees).

Figure 8:
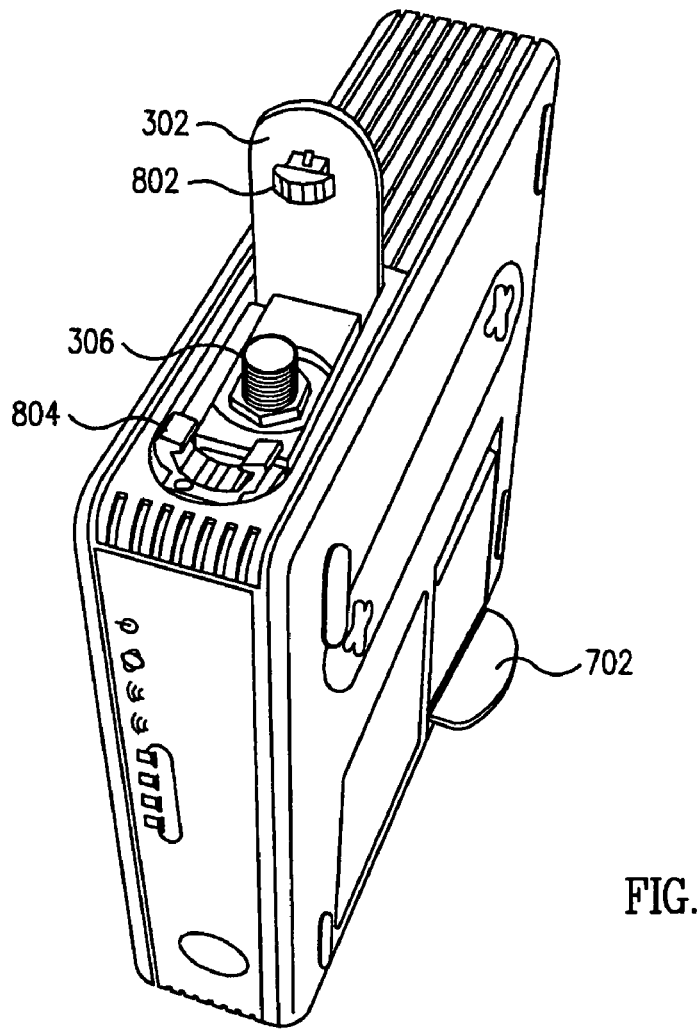
FIG. 8 shows a diagram illustrating a router with the stand engaged and the external antenna port door in the open position in accordance with an embodiment of the present invention.

When stand 702 is rotated to an open position, router 100 may be positioned to rest on stand 702 and possibly a portion of the second side of router 100, as illustrated in FIG. 8 in accordance with an embodiment of the present invention. Thus, router 100 may optionally be positioned to rest on one or more of its surfaces (e.g., top or bottom surface), including one of its sides by utilizing stand 702.

FIG. 8 also illustrates pivoting element 302 in an open position with external antenna connector 306 exposed to connect to the external antenna. As can be seen, pivoting element 302, in accordance with an embodiment of the present invention, may also include a protrusion 802 that engages a latch 804 to maintain pivoting element 302 in the closed position when it is not desired to attach an external antenna.

Figure 9:
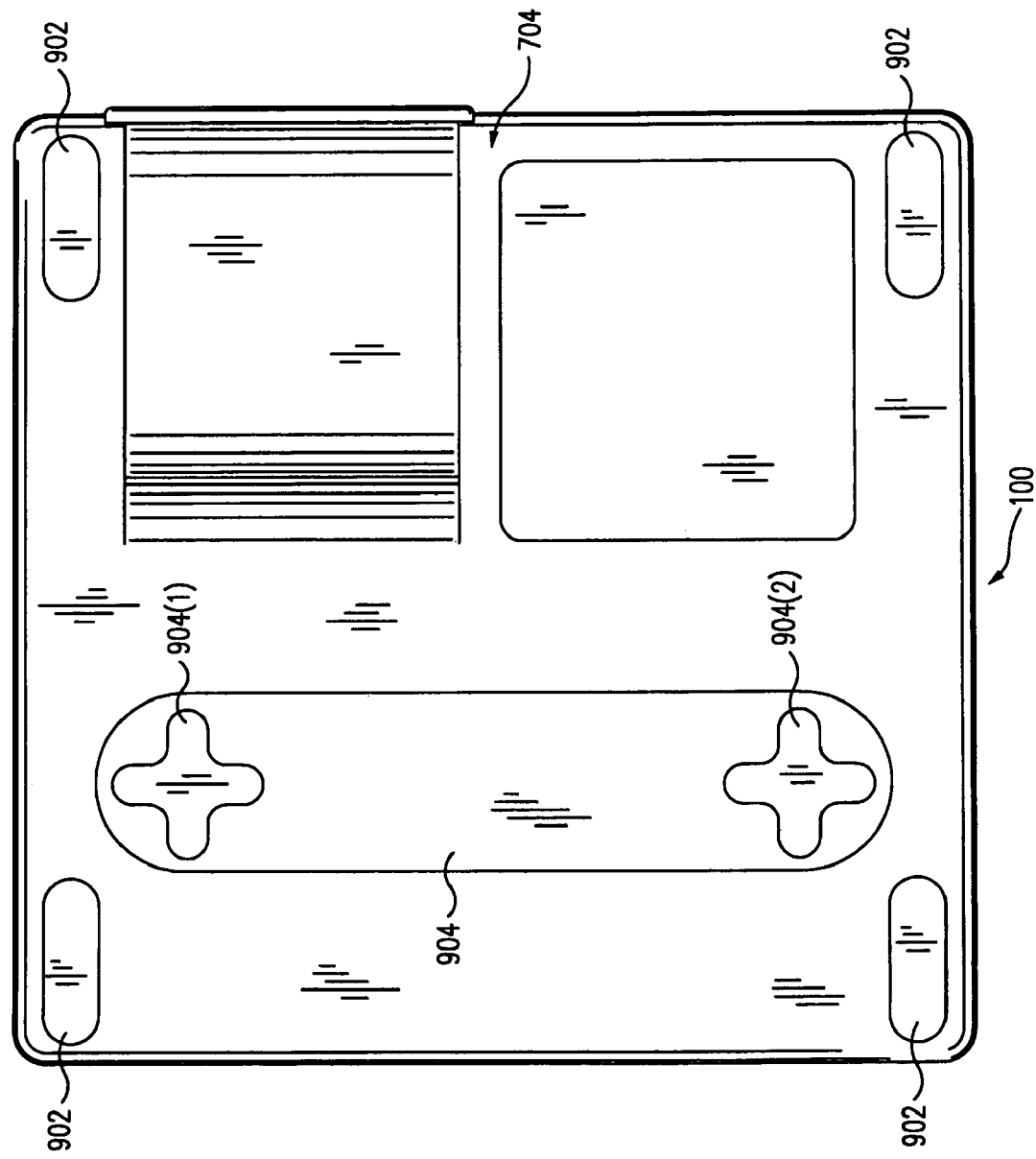
FIG. 9 shows a diagram illustrating a bottom of a router in accordance with an embodiment of the present invention.

FIG. 9 shows a diagram illustrating a bottom side (surface 704) of router 100 in accordance with an embodiment of the present invention. Surface 704 may include pads 902 to prevent router 100 from easily slipping on an object that surface 704 is placed upon when router 100 is positioned to rest on surface 704 (i.e., its bottom surface). Surface 704 may also include one or more indentations 904 (e.g., indentations 904(1) and 904(2)), which may be utilized to mount router 100 onto a vertical surface, such as a wall (e.g., by having indentations 904 engage with support screws, nails, or other supporting type members as would be known by one skilled in the art).

Systems and methods are disclosed herein to provide network devices (e.g., a router or other type of network device that can provide wireless communications, including range expanders, game adapters, wireless video cameras, print servers, access points, gateways, bridges, adapters, hubs, and switches). For example, in accordance with an embodiment of the present invention, a network device is disclosed that allows a user to utilize an internal antenna or attach an external antenna for wireless communications. An external antenna connector may be enclosed within the network device and accessed via an antenna port door of the network device. The network device may also include a selectable stand that may be rotated to provide a base and allow the network device to be positioned on its side rather than, for example, its bottom surface or top surface.

Embodiments described above illustrate but do not limit the invention. It should also be understood that numerous modifications and variations are possible in accordance with the principles of the present invention. Accordingly, the scope of the invention is defined only by the following claims.

I claim:

1. A network device comprising:
a transceiver adapted to transmit and receive information;
an internal antenna coupled to the transceiver;
an external antenna connector coupled to the transceiver; and
a housing enclosing the transceiver, the internal antenna, and the external antenna connector, wherein the housing further comprises a door operable to provide access to the external antenna connector by moving from a closed position to an open position, which moves the external antenna connector from within the housing to approximately an external surface of the housing.

2. The network device of claim 1, wherein the housing further comprises a stand operable to support the network device on a first side of the network device when placed on an approximately horizontal surface, wherein the stand is operable to support the network device by rotating from a parallel position to a perpendicular position relative to the first side.

3. The network device of claim 1, further comprising an external antenna adapted to be coupled to the external antenna connector.

4. The network device of claim 1, wherein the network device comprises at least one of a router, a range expander, a game adapter, a video camera, a print server, an access point, a gateway, a bridge, an adapter, a hub, and a switch.

5. The network device of claim 1, wherein the door is held in a closed position by a latch, the latch adapted to release the door when pushed towards the housing, and wherein the door is held in an open position by a hinge secured to the door.

6. The network device of claim 1, wherein the transceiver is adapted to transmit and receive information through an external antenna if the external antenna is coupled to the external antenna connector.

7. The network device of claim 6, wherein the transceiver switches from the internal antenna to the external antenna to transmit and receive information based on least one of a position of the door and a termination of the external antenna connector.

8. The network device of claim 6, wherein the transceiver is adapted to transmit and receive information through the internal antenna and the external antenna simultaneously.

9. A network apparatus comprising:
an internal antenna;
means for transmitting and receiving information through the internal antenna coupled to the transmitting and receiving means;
an external antenna terminal coupled to the transmitting and receiving means and adapted to couple to an external antenna for transmitting and receiving the information; and
a housing enclosing the transmitting and receiving means, the internal antenna, and the external antenna terminal, wherein the housing further comprises means for providing access for coupling the external antenna to the external antenna terminal, wherein the access providing means is adapted to move the external antenna terminal from within the housing to approximately an external surface of the housing.

10. The network apparatus of claim 9, further comprising means for indicating the status of the network device.

11. The network apparatus of claim 9, wherein the housing further comprises means for supporting the network apparatus on a first side of the network apparatus.

12. A method of providing an external antenna for a network device having an internal antenna connector and an antenna port door on the network device, the method comprising:
opening the antenna port door on the network device to provide access to the internal antenna connector for coupling the external antenna, wherein the opening of the antenna port door includes:
pushing the antenna port door towards the network device to release a latch holding the antenna port door closed; and
rotating the antenna port door away from the network device, which rotates the internal antenna connector from within the network device to approximately a surface of the network device; and
coupling the external antenna to the internal antenna connector.

13. The method of claim 12, wherein the network device further comprises an internal antenna within the network device for transmitting and receiving information, and wherein the method further comprises switching from transmitting and receiving through the internal antenna to transmitting and receiving through the external antenna.

14. The method of claim 12, further comprising opening a stand on the network device to support the network device to stand on a first side of the network device, wherein the opening includes rotating the stand from a parallel position to a perpendicular position relative to the first side.

15. A method for providing an additional antenna for a network device, the method comprising:
providing an internal antenna within the network device for transmitting and receiving information;
providing an internal antenna connector within the network device for coupling to an external antenna for transmitting and receiving information; and
providing an antenna port door on the network device, the antenna port door operable to provide access for coupling the external antenna to the internal antenna connector by moving from a closed position to an open position, which moves the internal antenna connector from within the housing to approximately an external surface of the housing.

16. The method of claim 15, further comprising providing a stand on the network device operable to permit the network device to stand on a first side of the network device.

17. The method of claim 15, further comprising providing a plurality of indicator lights to provide operational status of the network device.

18. The method of claim 16, wherein the stand is operable to support the network device by rotating from a parallel position to a perpendicular position relative to the first side.

* * * * *